(12) United States Patent
Kuroda

(10) Patent No.: US 11,063,340 B2
(45) Date of Patent: Jul. 13, 2021

(54) ANTENNA MODULE AND COMMUNICATION DEVICE

(71) Applicant: Murata Manufacturing Co., Ltd., Kyoto (JP)

(72) Inventor: Katsuhito Kuroda, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/016,607

(22) Filed: Sep. 10, 2020

(65) Prior Publication Data

US 2020/0411950 A1 Dec. 31, 2020

Related U.S. Application Data

(63) Continuation of application No. PCT/JP2020/001643, filed on Jan. 20, 2020.

(30) Foreign Application Priority Data

Jan. 22, 2019 (JP) .............................. JP2019-008420

(51) Int. Cl.
*H01Q 1/22* (2006.01)
*H01Q 5/335* (2015.01)
*H04B 7/0413* (2017.01)

(52) U.S. Cl.
CPC ......... *H01Q 1/2283* (2013.01); *H01Q 1/2208* (2013.01); *H01Q 5/335* (2015.01); *H04B 7/0413* (2013.01)

(58) Field of Classification Search
CPC .... H01Q 1/2283; H01Q 5/335; H01Q 1/2208; H01Q 9/0414; H01Q 1/40; H01Q 3/36;
(Continued)

(56) References Cited

U.S. PATENT DOCUMENTS 6,777,771 B1 8/2004 Marumoto et al.
10,468,763 B2 11/2019 Yokoyama et al.
(Continued)

FOREIGN PATENT DOCUMENTS

JP H08204410 A 8/1996
JP 2000295030 A 10/2000
(Continued)

OTHER PUBLICATIONS

International Search Report issued in Application No. PCT/JP2020/001643, dated Mar. 24, 2020.
(Continued)

*Primary Examiner* — Dimary S Lopez Cruz
*Assistant Examiner* — Michael M Bouizza
(74) *Attorney, Agent, or Firm* — Pearne & Gordon LLP

(57) ABSTRACT

The present disclosure includes: an RFIC (110A) and an RFIC (110B) that are configured to respectively supply radio-frequency power to a first antenna group and a second antenna group; and a divider that divides a reference frequency signal input thereto and outputs the resulting first radio-frequency signals to the RFIC (110A) and the RFIC (110B). The divider is a Wilkinson-type first divider that is formed of a circuit system of a second impedance that is lower than a first impedance that is an impedance of signal transmission system into which the divider is inserted.

11 Claims, 13 Drawing Sheets

(58) Field of Classification Search
CPC .......... H01Q 3/28; H01Q 21/065; H01Q 1/38; H04B 7/0413; H01P 5/19
See application file for complete search history.

(56) References Cited

U.S. PATENT DOCUMENTS

| | | |
|---|---|---|
| 2010/0066631 A1 | 3/2010 | Puzella et al. |
| 2016/0204517 A1* | 7/2016 | Hu ..................... H01Q 21/065 343/824 |
| 2016/0365617 A1 | 12/2016 | Vickes |
| 2018/0323159 A1* | 11/2018 | Kamgaing ............... H01Q 1/38 |
| 2019/0131721 A1* | 5/2019 | Dani ........................ H01Q 3/36 |
| 2020/0235456 A1 | 7/2020 | Yoshioka et al. |

FOREIGN PATENT DOCUMENTS

| | | |
|---|---|---|
| JP | 2010251904 A | 11/2010 |
| JP | 2012521716 A | 9/2012 |
| KR | 1020170127969 A | 11/2017 |
| WO | 2016067969 A1 | 5/2016 |
| WO | 2017208432 A1 | 12/2017 |

OTHER PUBLICATIONS

Written Opinion issued in Application No. PCT/JP2020/001643, dated Mar. 24, 2020.

* cited by examiner

ANTENNA MODULE AND COMMUNICATION DEVICE

This is a continuation of International Application No. PCT/JP2020/001643 filed on Jan. 20, 2020 which claims priority from Japanese Patent Application No. 2019-008420 filed on Jan. 22, 2019. The contents of these applications are incorporated herein by reference in their entireties.

BACKGROUND

Technical Field

The present embodiments relate to an antenna module and a communication device.

Heretofore, multiple-input and multiple-output (MIMO) technology, in which a plurality of antenna elements (for example, two to eight antenna elements) are used on the transmission side and the reception side to perform communication, is known in the field of wireless communications, such as in mobile terminals. An advantage of using MIMO technology is that it is possible to improve data throughput and the distance over which a link can be established without necessarily increasing the bandwidth of the communication frequency and the transmission output. International Publication No. 2016/067969 (Patent Document 1) discloses an antenna module in which antenna elements and a radio-frequency semiconductor element are mounted in an integrated manner on a dielectric substrate having a multilayer structure. In the antenna module disclosed in Patent Document 1, a radio-frequency signal is supplied to a plurality of antenna elements from a single radio-frequency semiconductor element and the antenna module can also be used for MIMO.

Patent Document 1: International Publication No. 2016/067969

BRIEF SUMMARY

In recent years, the number of users of mobile terminals, such as smartphones has been increasing and furthermore the number of electronic appliances having wireless communication functions has also been increasing as a result of technological innovations, such as IoT. Consequently, there is a concern that the amount of communication traffic in wireless networks will increase and communication speed and communication quality will decrease.

In order to solve these problems, massive MIMO, which is a further development of the above-mentioned MIMO technology, has attracted attention. Massive MIMO is a technology for improving communication speed and communication quality by using a greater number of antenna elements (for example, 128 antenna elements) than in normal MIMO in order to realize advanced beamforming and spatial multiplexing techniques and by assigning individual radio waves to terminals.

When wireless transmission using a large number of antenna elements is performed, radio-frequency signals that are to be transmitted to a plurality of antenna elements are output from a plurality of radio-frequency semiconductor elements. Furthermore, the same reference signal is input to the plurality of radio-frequency semiconductor elements. Therefore, in the antenna module, a divider is used to divide the reference signal and supply the resulting signals to the plurality of radio-frequency semiconductor elements. On the other hand, further reductions in the size and thickness of communication devices, such as mobile terminals are being demanded and this in turn leads to demands for further reductions in the size and thickness of antenna modules.

The present embodiments reduces the size of an antenna module having a built-in divider.

An antenna module according to a certain aspect of the present disclosure includes: a dielectric substrate having a multilayer structure; a first antenna group and a second antenna group that are arranged in the dielectric substrate and each includes a plurality of antenna elements; a first feeder circuit and a second feeder circuit that are configured to respectively supply radio-frequency power to the first antenna group and the second antenna group; and a dividing circuit. The dividing circuit divides a first radio-frequency signal input thereto and outputs the resulting first radio-frequency signals to the first feeder circuit and the second feeder circuit. The first feeder circuit and the second feeder circuit are mounted on a mounting surface of the dielectric substrate. The dividing circuit is arranged in a layer of the dielectric substrate that is nearer the mounting surface than a layer of the dielectric substrate in which the first antenna group and the second antenna group are arranged. The dividing circuit includes a Wilkinson-type first divider that is formed of a circuit system of a second impedance that is lower than a first impedance that is an impedance of signal transmission system into which the dividing circuit is inserted.

According to the antenna module of this embodiment, a size reduction is realized for an antenna module having a built-in divider.

DETAILED DESCRIPTION

Figure 1:
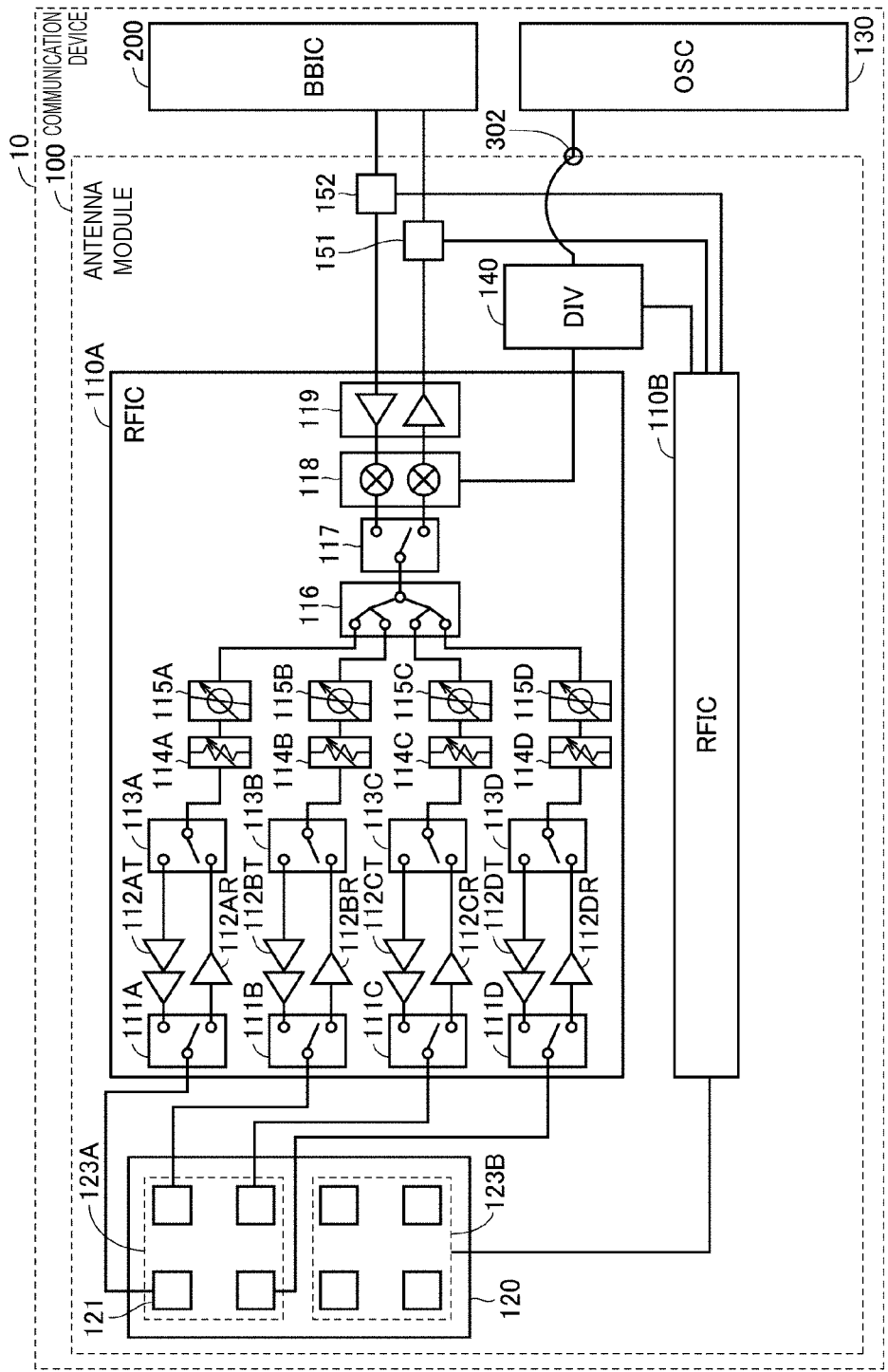
FIG. 1 is a block diagram of a communication device in which an antenna module according to an embodiment is used.

Hereafter, embodiments will be described in detail while referring to the drawings. In the figures, the same symbols denote identical or corresponding portions and repeated description thereof is omitted.

First Embodiment (Basic Configuration of Communication Device)

FIG. 1 is a block diagram of a communication device 10 in which an antenna module 100 according to this embodiment is used. The communication device 10 is for example a mobile terminal, such as a mobile phone, a smartphone, or a tablet, a personal computer having a communication function, and so on.

Referring to FIG. 1, the communication device 10 includes the antenna module 100, a BBIC 200 that forms a baseband signal processing circuit, and an oscillator 130 (OSC).

The antenna module 100 includes two radio-frequency integrated circuits (RFICs) 110A and 110B, an antenna array 120, a divider (DIV) 140, a combining chip 151, and a dividing chip 152.

The antenna array 120 includes a plurality of antenna elements 121. In FIG. 1, eight antenna elements 121 are two-dimensionally arranged in a 4×2 pattern as the plurality of antenna elements 121. FIG. 1 illustrates an example in which the antenna module 100 functions as a patch antenna. In addition, a configuration in which the RFICs 110A and 110B are respectively provided for antenna groups 123A and 123B, each of which consists of four antenna elements 121, is illustrated as an example. The antenna group 123A corresponds to a "first antenna group" and the antenna group 123B corresponds to a "second antenna group". Furthermore, the RFIC 110A corresponds to a "first feeder circuit" and the RFIC 110B corresponds to a "second feeder circuit".

Note that, in FIG. 1, the detailed configuration of the RFIC 110A corresponding to the antenna group 123A is illustrated but illustration of the configuration corresponding to the other RFIC 110B, which has the same configuration, is omitted for ease of description.

In the following description, the RFICs 110A and 110B are collectively referred to as "RFICs 110" and the antenna groups 123A and 123B are collectively referred to as "antenna groups 123".

The oscillator 130 is an oscillator that generates a reference frequency signal that is used in the RFICs 110. The reference frequency signal has a frequency of 23 to 26 GHz, for example. The reference frequency signal is a signal having a wavelength in units of millimeters and is a so-called millimeter wave signal. The reference frequency signal corresponds to a "first radio-frequency signal". The oscillator 130 corresponds to a "first output circuit". The oscillator 130 is connected to the antenna module 100 by an input terminal 302. The input terminal 302 corresponds to a "terminal". The oscillator 130 transmits the reference frequency signal to the antenna module 100 via the input terminal 302.

The divider 140 divides the first radio-frequency signal input to the divider 140 and outputs the resulting first radio-frequency signals to the RFIC 110A (first feeder circuit) and the RFIC 110B (second feeder circuit). In this embodiment, the divider 140 divides the first radio-frequency signal input to the divider 140 and outputs the resulting first radio-frequency signals to a mixer 118 of the RFIC 110A (first feeder circuit) and a mixer 118 of the RFIC 110B (second feeder circuit). Furthermore, the divider 140 may also be referred to as a "first divider 1401".

Furthermore, the BBIC 200 transmits a signal of an intermediate frequency to the antenna module 100. The signal of an intermediate frequency is for example a signal having a frequency of 3.5 GHz±0.5 GHz and is a signal having a lower frequency than the first radio-frequency signal. The intermediate frequency signal corresponds to a "second radio-frequency signal". In addition, the BBIC 200 corresponds to a "second output circuit".

Furthermore, the dividing chip 152 is provided on a signal line along which a signal output from the BBIC 200 is transmitted. The dividing chip 152 divides the signal output from the BBIC 200 and supplies the resulting signals to the RFICs 110A and 110B.

In addition, the combining chip 151 is provided on signal lines along which signals output from amplification circuits 119 of the RFICs 110A and 110B are transmitted. The combining chip 151 combines signals output from the amplification circuits 119 of the RFICs 110A and 110B and outputs the resulting signal to the BBIC 200.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal multiplexer/demultiplexer 116, the mixer 118, and the amplification circuit 119. Note that in the example illustrated in FIG. 1, the mixer 118 is illustrated as being mounted in the RFIC 110A, but the mixer 118 may instead be mounted in another IC (for example, the BBIC 200 and so forth).

In the case where a radio-frequency signal is to be transmitted, the switches 111A to 111D and 113A to 113D are switched to the power amplifiers 112AT to 112DT and the switch 117 is connected to a transmission-side amplifier of the amplification circuit 119. In the case where a radio-frequency signal is to be received, the switches 111A to 111D and 113A to 113D are switched to the low-noise amplifiers 112AR to 112DR and the switch 117 is connected to a reception-side amplifier of the amplification circuit 119.

The second radio-frequency signal output from the BBIC 200 is divided by the dividing chip 152 and the resulting second radio-frequency signals are transmitted to the amplification circuits 119 of the RFICs 110A and 110B. The transmitted signal is amplified by the amplification circuit 119 and up-converted by the mixer 118. The up-converted transmission signal is divided into four signals by the signal multiplexer/demultiplexer 116, and the four signals pass along four signal paths and are supplied to different antenna elements 121. In this case, the directivity of the antenna array 120 can be adjusted by individually adjusting the phases of the phase shifters 115A to 115D arranged along the respective signal paths.

In addition, reception signals received by the antenna elements 121 pass along four different signal paths and are multiplexed by the signal multiplexer/demultiplexer 116. The multiplexed reception signal is down converted by the mixer 118 and amplified by the amplification circuit 119. All the signals amplified by the amplification circuits 119 of the RFICs 110A and 110B are output to the combining chip 151. The combining chip 151 combines all the signals amplified by the amplification circuits 119 of the RFICs 110A and 110B and outputs the resulting signal to the BBIC 200.

The RFICs 110 are, for example, each formed as a single chip integrated circuit component including the above-described circuit configuration. Alternatively, devices (switches, power amplifiers, low-noise amplifiers, attenuators, and phase shifters) corresponding to the individual antenna elements 121 among the devices included in the RFICs 110 may be formed as a single chip integrated circuit component for each corresponding antenna element 121.

The mixer 118 of each RFIC 110 generates radio-frequency power by mixing the first radio-frequency signal and the second radio-frequency signal with each other. The RFICs 110 function as feeder circuits that supply the generated radio-frequency power to the antenna elements 121.

The communication device 10 up converts a signal transmitted to the antenna module 100 from the BBIC 200 into a radio-frequency signal and radiates the radio-frequency signal from the antenna array 120 and the communication device 10 down converts a radio-frequency signal received by the antenna array 120 and subjects the down-converted signal to signal processing using the BBIC 200.

(Configuration of Antenna Module)

Figure 2:
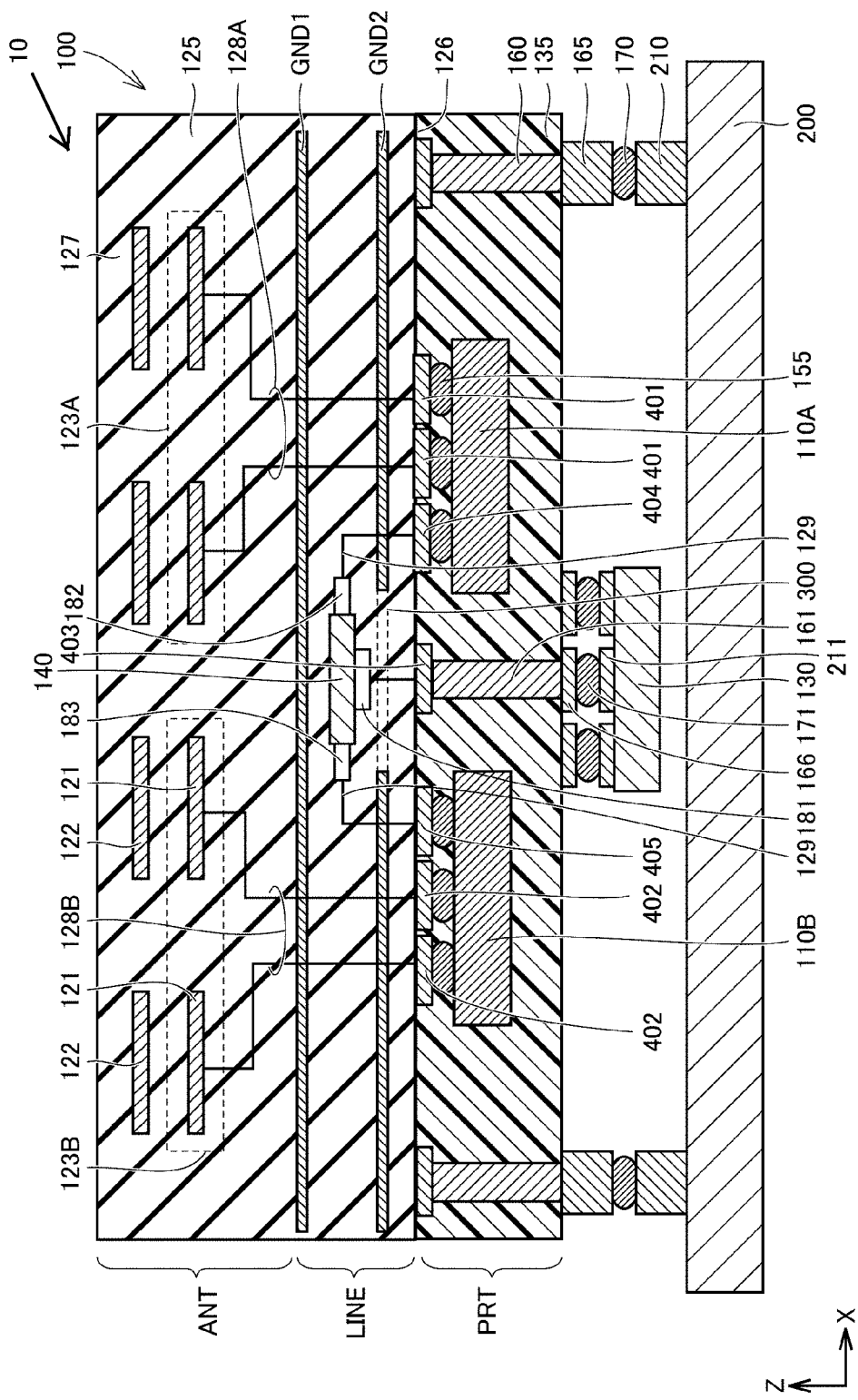
FIG. 2 is a sectional view of a state in which an antenna module is mounted on a BBIC.
Figure 3:
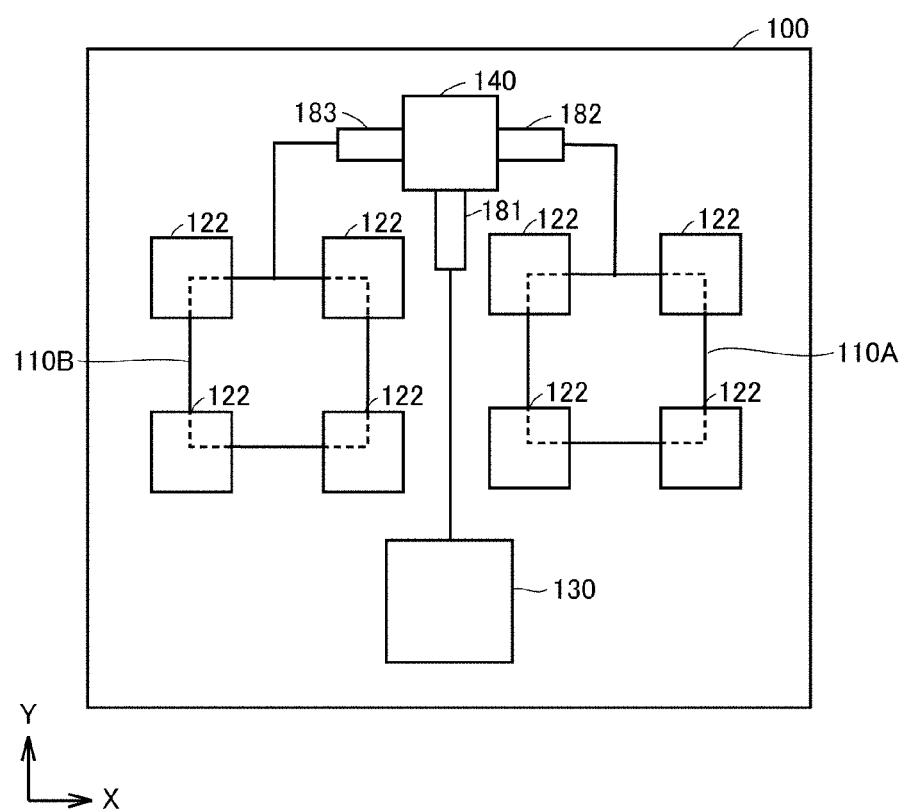
FIG. 3 is a plan view of an antenna module in a normal direction.

FIG. 2 is a sectional view of a state in which the antenna module 100 in FIG. 1 is mounted on the BBIC 200. A Z axis is an axis that extends in the stacking direction of the multilayer structure of a dielectric substrate 125. An X axis and a Y axis are axes that are perpendicular to the Z axis. The Z axis direction is also referred to as a normal direction. FIG. 3 is a plan view of the antenna module 100 in the normal direction and illustrates the divider 140 and so forth. Referring to FIGS. 2 and 3, the antenna module 100 includes the multilayer-structure dielectric substrate 125. The dielectric substrate 125 is for example formed of a low-temperature co-fired ceramic (LTCC). In addition, for example, the dielectric substrate 125 may be a multilayer resin substrate formed by stacking a plurality of resin layers composed of a resin, such as epoxy resin or polyimide, a multilayer resin substrate formed by stacking a plurality of resin layers formed of a liquid crystal polymer (LCP) having a lower dielectric constant, a multilayer resin substrate formed by stacking resin layers formed of a fluorine-based resin, or a ceramic substrate other than an LTCC substrate.

The antenna elements 121 illustrated in FIG. 1 are arranged in a layer inside the dielectric substrate 125. In FIG. 2, two of each of the antenna elements included in the antenna group 123A and the antenna group 123B are illustrated.

First terminal electrodes 401, second terminal electrodes 402, a third terminal electrode 403, a fourth terminal electrode 404, a fifth terminal electrode 405, and so forth are formed on a mounting surface 126 of the dielectric substrate 125. Although not illustrated, electrode patterns for mounting devices and wiring patterns for electrically connecting electrode patterns to each other are formed on the mounting surface 126 of the dielectric substrate 125.

Furthermore, as will be described later, a first impedance converter 181 is provided at an input terminal of the divider 140 and second impedance converters 182 and 183 are provided at the two output terminals of the divider 140. Hereafter, the first impedance converter 181 and the second impedance converters 182 and 183 are collectively referred to as "impedance converters". The line lengths of the impedance converters (first impedance converter and second impedance converter) are designed so as to be λ/4, where λ is the wavelength of a typical radio-frequency signal to be transmitted. In other words, in this embodiment, the impedance converters are so-called λ/4 transformers.

The RFIC 110A and the RFIC 110B are mounted on the mounting surface 126 via solder bumps 155.

The RFIC 110A is connected to the antenna elements included in the antenna group 123A via the solder bumps 155, the first terminal electrodes 401, and feeder lines 128A. Therefore, radio-frequency power is supplied from the RFIC 110A to the antenna elements included in the antenna group 123A via the solder bumps 155, the first terminal electrodes 401, and the feeder lines 128A. The first terminal electrodes 401 are electrodes for supplying radio-frequency power to the antenna group 123A.

The RFIC 110B is connected to the antenna elements included in the antenna group 123B via the solder bumps 155, the second terminal electrodes 402, and feeder lines 128B. Therefore, radio-frequency power is supplied from the RFIC 110B to the antenna elements included in the antenna group 123B via the solder bumps 155, the second terminal electrodes 402, and the feeder lines 128B. The second terminal electrodes 402 are electrodes for supplying radio-frequency power to the antenna group 123B.

In the example in FIG. 2, the feeder lines 128A and 128B pass through a ground electrode GND1 and a ground electrode GND2 and are connected to the antenna elements 121 included in the respective antenna groups.

The devices mounted on the mounting surface 126 are sealed by resin 135. I/O through electrodes 160, which are for transmitting and receiving signals to and from the BBIC 200, are formed in the resin 135. End portions of the through electrodes 160 on the side near the mounting surface 126 are connected to wiring patterns formed on the mounting surface 126. In addition, end portions of the through electrodes 160 that are exposed at the surface near the BBIC 200 are connected to connection terminals 210 on the surface of the BBIC 200 via electrode patterns 165 and solder bumps 170. Signals are transmitted and received between the BBIC 200 and the RFICs 110 via through electrodes 160 and the wiring patterns on the mounting surface 126.

Furthermore, an I/O through electrode 161, which is for transmitting a signal (first radio-frequency signal) from the oscillator 130, is formed. The through electrode 161 corresponds to the input terminal 302. The end portion of the through electrode 161 on the side near the mounting surface 126 is connected to the first impedance converter 181 via a solder bump 155 and the third terminal electrode 403. The third terminal electrode 403 is an electrode to which the first radio-frequency signal is input. In addition, the end portion of the through electrode 161 that is exposed at the surface near the oscillator 130 is connected to a connection terminal 211 on the surface of the oscillator 130 via an electrode pattern 166 and a solder bump 171. The first radio-frequency signal from the oscillator 130 is input to the divider 140 via the through electrode 161 and a wiring pattern on the mounting surface 126. The first radio-frequency signal is divided and supplied to each RFIC 110 by the divider 140.

The RFIC 110A is connected to the second impedance converter 182 via a solder bump 155 and the fourth terminal electrode 404. The fourth terminal electrode 404 is an electrode that outputs the first radio-frequency signal divided by the divider 140 to the RFIC 110A.

The RFIC 110B is connected to the second impedance converter 183 via a solder bump 155 and the fifth terminal electrode 405. The fifth terminal electrode 405 an electrode that outputs the first radio-frequency signal divided by the divider 140 to the RFIC 110B.

In the dielectric substrate 125, the ground electrode GND1 (first ground electrode) is formed in a layer between the antenna elements 121 and the mounting surface 126 and the ground electrode GND2 (second ground electrode) is formed in a layer between the ground electrode GND1 and the mounting surface 126. A through hole 300 is formed in the ground electrode GND2. A via extends through the through hole 300. The via connects the through electrode 161 and the first impedance converter 181 to each other. The ground electrode GND2 is arranged in the XY plane outside the through hole 300.

In this embodiment, passive elements 122 are arranged at positions corresponding to the antenna elements 121 in a layer of the dielectric substrate 125 that is nearer a surface 127 than the layer in which the antenna elements 121 are arranged.

The part of the dielectric substrate 125 located on the side of ground electrode GND1 near the surface 127 practically functions as an antenna in the antenna module 100 and this region is referred to as an "antenna layer ANT" in this specification. Furthermore, wiring patterns that connect individual devices mounted on the mounting surface 126 to each other or connect the individual devices and antenna elements to each other are formed in the region between the ground electrode GND1 and the ground electrode GND2 in the dielectric substrate 125, and this region is referred to as a "wiring layer LINE" in this specification. In addition, the region sealed by the resin 135 is referred to as a "component layer PRT" in this specification.

The divider 140 is arranged in the dielectric substrate 125 in a layer that is nearer the mounting surface 126 than the layer in which the antenna group 123A and the antenna group 123B are arranged.

The divider 140 is arranged in the above-mentioned wiring layer LINE. The divider 140 is connected to the oscillator 130 mounted on the mounting surface 126 and is connected to the RFICs 110 by wiring patterns 129 formed in the wiring layer LINE. The divider 140 receives the reference frequency signal from the oscillator 130 and divides the reference frequency signal and supplies the resulting reference frequency signals to the RFICs 110.

Furthermore, the conductors constituting the antenna elements 121, the wiring patterns 129, the through electrodes 160 and 161, and so forth are formed of metal layers having aluminum (Al), copper (Cu), gold (Au), silver (Ag), or an alloy of any of these metals as a main component.

Figure 9:
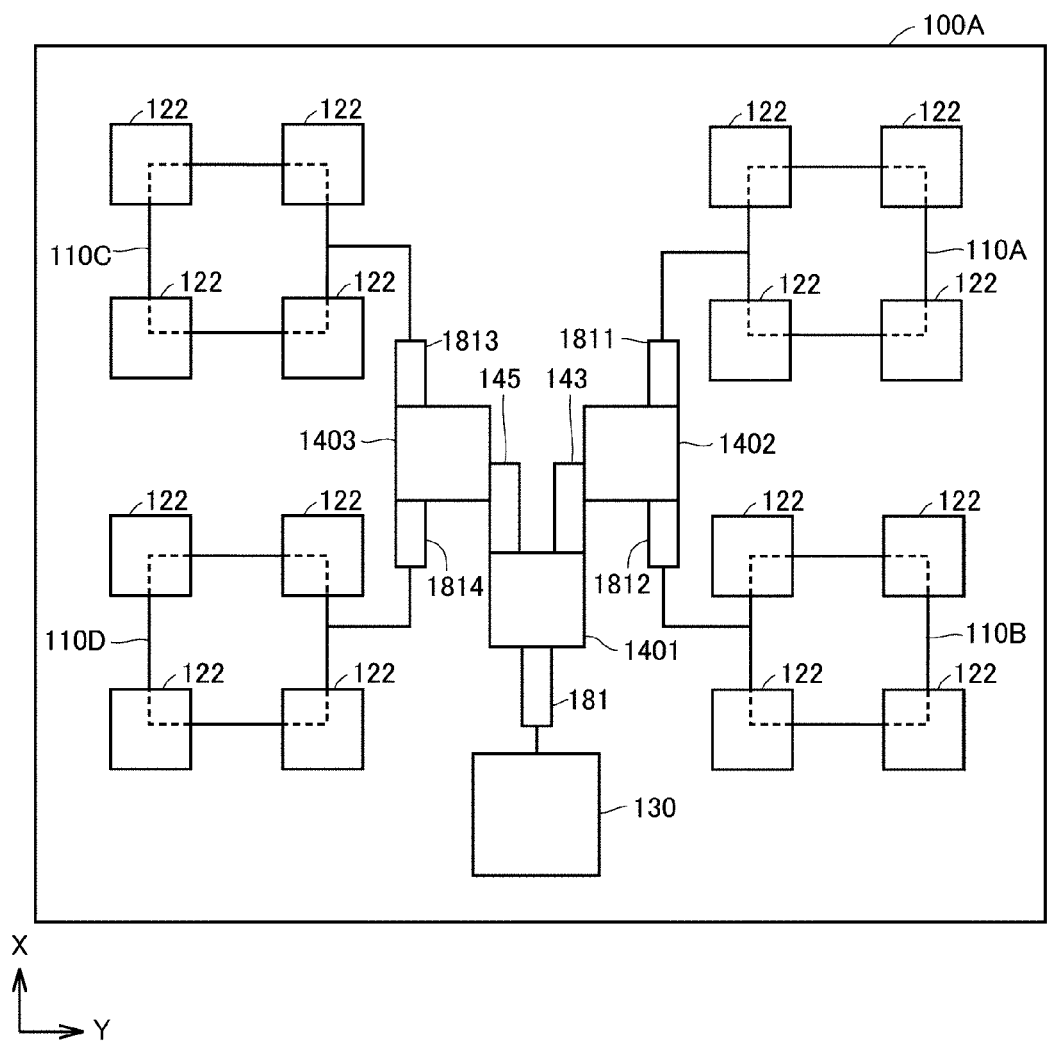
FIG. 9 is a plan view of an antenna module of a third embodiment in a normal direction.

Illustration of the combining chip 151 and the dividing chip 152 is omitted from FIGS. 2, 3, and 9, but the combining chip 151 and the dividing chip 152 may be illustrated in FIGS. 2, 3, and 9.

Furthermore, as illustrated in FIG. 3, a configuration is adopted in which the divider 140 and the RFICs 110A and 110B do not overlap in a plan view of the antenna module 100 in the Z axis direction. By adopting this configuration, the height (length in Z axis direction) of the antenna module 100 can be reduced (the profile can be reduced) compared with "a configuration in which the divider 140 and the RFICs 110A and 110B overlap". A configuration may instead be adopted in which at least part of the divider 140 overlaps the RFICs 110A and 110B in a plan view of the antenna module 100 in the Z axis direction. When this configuration is adopted, a GND is preferably provided between the divider 140 and the RFICs 110A and 110B in order to prevent electromagnetic coupling therebetween.

Furthermore, as illustrated in FIG. 3, the first impedance converter 181 is provided between the RFIC 110A and the RFIC 110B in a plan view of the antenna module 100 in the normal direction. Therefore, since it can be ensured that the antenna module 100 is not elongated in the X axis direction, the antenna module 100 can be reduced in size and consequently there is no need to provide long wiring lines and signal transmission loss can be reduced.

Furthermore, in the example in FIG. 2, an example is illustrated in which the first impedance converter 181 is arranged in a layer below the divider 140 and the second impedance converters 182 and 183 are arranged in the same layer as the divider 140. However, the first impedance converter 181 may be provided in the same layer as the divider 140. In addition, the second impedance converters 182 and 183 may be arranged in a different layer from the divider 140.

In addition, in the example in FIG. 2, the divider 140 is illustrated as having a larger thickness than the second impedance converters 182 and 183. However, the divider 140 and the second impedance converters 182 and 183 may instead have the same thickness. In addition, the divider 140 may have a smaller thickness than the second impedance converters 182 and 183. However, it is preferable that the divider 140 and the second impedance converters 182 and 183 be configured to have the same line thickness in order to realize a low profile for the antenna module 100.

(Configurations of Distributor and So Forth)

Figure 4:
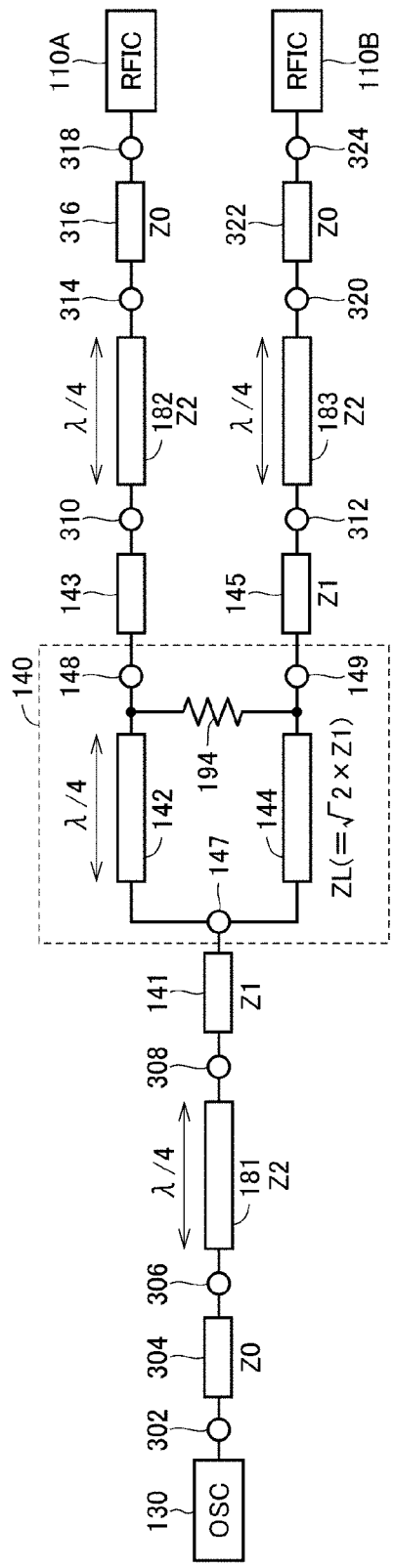
FIG. 4 is a diagram for explaining the detailed configuration of a divider and so forth.

FIG. 4 is a diagram illustrating the transmission paths of the first radio-frequency signal transmitted from the oscillator 130 to the RFICs. In this embodiment, a Wilkinson-type divider is used as the divider 140. The Wilkinson-type divider is characterized by having low loss compared with other types of dividers and in that the divided signals have the same phase as each other.

The divider 140 includes an input terminal 147, a line 142, a line 144, a resistor 194, a first output terminal 148, and a second output terminal 149.

The input terminal 147 in this embodiment functions as a branching part that branches the signal input to the input terminal 147 into two signals. One end of a line 141 is connected to the input terminal 147. One end of the first impedance converter 181 is connected to the other end of the line 141 via a connection part 308. One end of a line 304 is connected to the other end of the first impedance converter 181 via a connection part 306. The oscillator 130 is connected to the other end of the line 304 via the input terminal 302.

One end of a line 143 is connected to the first output terminal 148. One end of the second impedance converter 182 is connected to the other end of the line 143 via a connection part 310. One end of a line 316 is connected to the other end of the second impedance converter 182 via a connection part 314. The other end of the line 316 is connected to the RFIC 110A via an output terminal 318.

One end of a line 145 is connected to the second output terminal 149. One end of the second impedance converter 183 is connected to the other end of the line 145 via a connection part 312. One end of a line 322 is connected to the other end of the second impedance converter 183 via a connection part 320. The other end of the line 322 is connected to the RFIC 110B via an output terminal 324.

In addition, the resistor 194 is connected between the first output terminal 148 and the second output terminal 149 in order to ensure that the two branched outputs are isolated from each other.

Next, signal flow will be described. The reference frequency signal output from the oscillator 130 is sequentially transmitted through the input terminal 302, the line 304, the connection part 306, the first impedance converter 181, the connection part 308, the line 141, and the input terminal 147 (branching part). The reference frequency signal input to the input terminal 147 (branching part) is branched into two signals at the input terminal 147 (branching part).

One signal out of the two signals generated by branching at the input terminal 147 (branching part) is sequentially transmitted through the line 142, the first output terminal 148, the line 143, the connection part 310, the second impedance converter 182, the connection part 314, the line 316, and the output terminal 318 and is input to the RFIC 110A.

The other signal out of the two signals generated by branching at the input terminal 147 (branching part) is sequentially transmitted through the line 144, the second output terminal 149, the line 145, the connection part 312, the second impedance converter 183, the connection part 320, the line 322, and the output terminal 324 and is input to the RFIC 110B. Thus, the divider 140 divides the reference frequency signal input from the input terminal 147 and supplies the resulting reference frequency signals to the RFIC 110A and the RFIC 110B.

Next, the impedance and so forth of the divider 140 and so on will be described. The line 304, the line 316, and the line 322 each has an impedance value of Z0. The line 141, the line 143, and the line 145 each has an impedance value of Z1. Z0 is set to be greater than Z1. Z0 corresponds to a "first impedance". Z1 corresponds to a "second impedance".

An impedance ZR of the resistor 194 is set to be 2×Z1. Impedances ZL of the line 142 and the line 144 are set to be √2×Z1. The line lengths of the lines 142 and 144, the first impedance converter 181, the second impedance converter 182, and the second impedance converter 183 are set to be λ/4, where λ is the wavelength of a typical radio-frequency signal to be transmitted.

Next, the impedance converters (the first impedance converter 181, the second impedance converter 182, and the second impedance converter 183) will be described. The following Formula (1) is established for an impedance Z2 of an impedance converter having a length of λ/4, the impedance Z0 of a line connected to one side of the impedance converter, and the impedance Z1 of a line connected to the other side of the impedance converter.

[Math 1]

$$Z2=\sqrt{Z0 \cdot Z1} \quad (1)$$

For example, if the impedance Z0 (impedance of the line 304, the line 316, and the line 322)=50Ω and the impedance Z1 (impedance of the line 141, the line 143, and the line 145)=25Ω, then the values of the respective impedances are as follows.

Z2 (impedance of impedance converter)=around 35.3 Ω
ZL (impedance of line 142 and line 144)=around 35.3 Ω
ZR (impedance of resistor 194)=50 Ω

Thus, the first impedance converter 181, the second impedance converter 182, and the second impedance converter 183 are so-called λ/4 transformers and the impedances of the λ/4 transformers are designed to be around 35.3Ω.

The first impedance converter 181 is connected to the input terminal 147 of the divider 140 via the line 141. In addition, the first impedance converter 181 is configured to transform the first impedance (impedance Z0 of line 304) into the second impedance (impedance Z1 of line 304).

The second impedance converter 182 is connected to the first output terminal 148 of the divider 140 via the line 143. In addition, the second impedance converter 182 is configured to transform the second impedance (impedance Z1 of line 143) into the first impedance (impedance Z0 of line 316).

The second impedance converter 183 is connected to the second output terminal 149 of the divider 140 via the line 145. In addition, the second impedance converter 183 is configured to transform the second impedance (impedance Z1 of line 145) into the first impedance (impedance Z0 of line 322).

Furthermore, the divider 140 is inserted into a signal transmission system of the first impedance. In the example in FIG. 4, the divider 140 is inserted into signal lines formed of lines having an impedance Z0 as an example of the first impedance. Signal lines of the signal transmission system of the first impedance correspond to "the line 304, the line 316, and the line 322".

In addition, the divider 140 is a Wilkinson-type divider formed of a circuit system of the second impedance. In this embodiment, "the divider 140 formed of a circuit system of the second impedance" is a divider set up on the basis of the second impedance (25Ω). In other words, "the divider 140 formed of a circuit system of the second impedance" is a divider in which the input impedance and the output impedance (25Ω) are lower than the first impedance (50Ω).

Hereafter, "the signal transmission system of the first impedance" may be referred to as a "first impedance system" and "the circuit system of the second impedance" may be referred to as a "second impedance system".

In the example in FIG. 4, the divider 140 is a divider set up on the basis of the impedance Z1, which is an example of the second impedance. Furthermore, it is sufficient that the input impedance and the output impedance of the divider 140 (first divider 1401) be the second impedance, but the characteristic impedance of the transmission lines forming the divider 140 may be configured to be higher than the first impedance.

In this embodiment, Z2=ZL and the impedances of the lines related to the impedance converters, the line 142, and the line 144 are the same.

Figure 5:
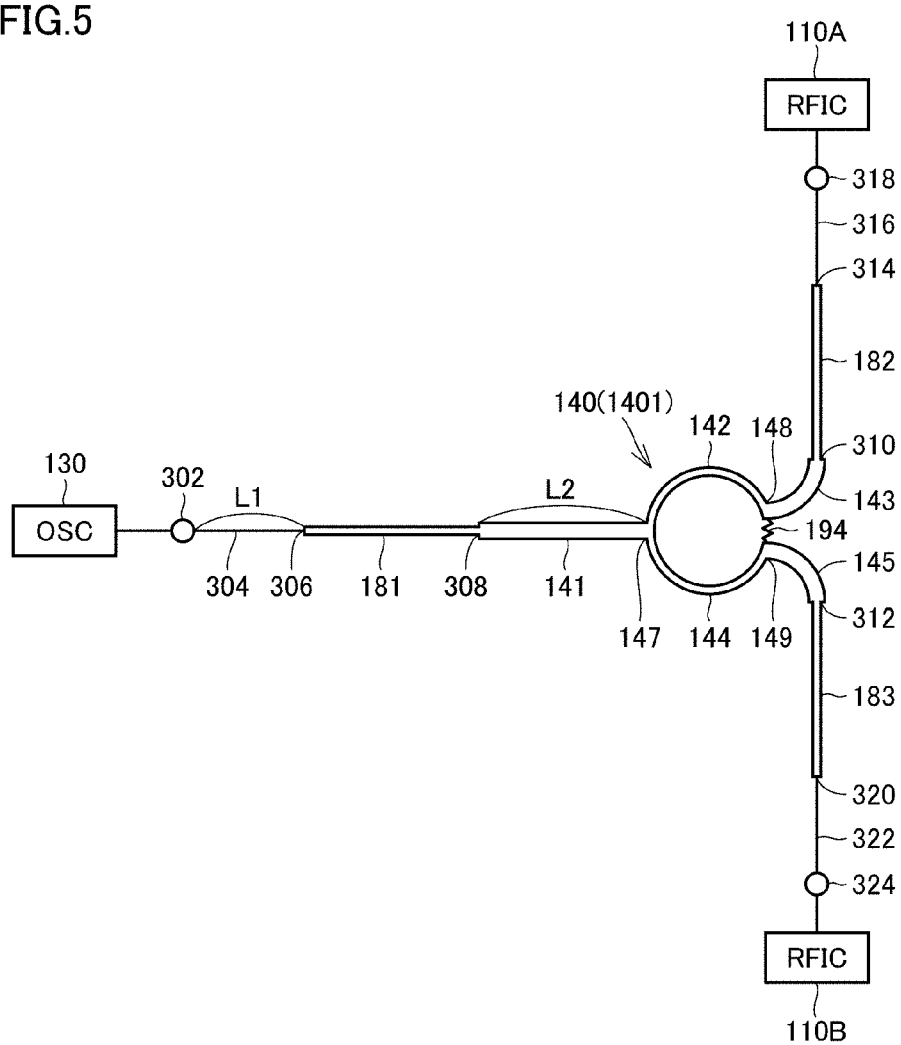
FIG. 5 is a diagram illustrating a divider in a more specific manner.

FIG. 5 is a diagram illustrating the divider 140 in a more specific manner than in FIG. 4. In FIG. 5, the line 142 and the line 144 are illustrated as being curved. Furthermore, in FIG. 5, the lines are illustrated as being thicker the lower their impedances.

For example, the impedance of the line 304 is 50Ω, the impedance of a line related to the first impedance converter 181 is 35.3Ω, and the impedance of the line 141 is 25Ω. When the width of the line 141 is A, the width of the line related to the first impedance converter 181 is B, and the width of the line 304 is C, A>B>C as illustrated in FIG. 5.

In this embodiment, a length L1 of the line 304 is set to be shorter than a length L2 of the line 141.

In general, the impedance of a divider formed of a strip line or a micro-strip line increases as the distance between the line forming the divider (140 in FIG. 2 in this embodiment) and the GND (ground electrode GND1 or ground electrode GND2 in FIG. 2 in this embodiment) becomes larger. Therefore, it is suitable to increase the distance between the line and GND as the impedance of the divider increases, and consequently the thickness of the dielectric layer (wiring layer LINE in this embodiment) of the dielectric substrate in which the divider is arranged increases. Therefore, the thickness of the entire antenna module (length of antenna module 100 in stacking direction in this embodiment) undesirably increases when the thickness of the dielectric layer in which the divider is arranged increases.

Therefore, in this embodiment, the divider 140 is inserted between the signal lines of the first impedance system (between the lines 304, 316, and 322). In addition, the divider 140 is formed of the second impedance system, which has a lower impedance than the first impedance.

Therefore, in "an antenna module of the second impedance system, which is a low impedance system of this embodiment", the dielectric layer in which the divider 140 is arranged (for example, the wiring layer LINE) can be made thinner than in "an antenna module having a divider formed of the first impedance system". As a result, the thickness of the antenna module can be reduced compared with "an antenna module having a divider formed of the first impedance system".

In addition, when the wiring layer LINE in which the divider 140 is arranged can be made thinner in the case where the thickness of the antenna module is constant, the thickness of the antenna layer ANT can be secured. Therefore, the degree of freedom in arranging the wiring lines in the antenna layer ANT can be improved.

Furthermore, the thickness of electrodes (the antenna elements 121 and the passive elements 122 in the example in FIG. 2) can be increased as a result of the thickness of the antenna layer ANT being secured. Therefore, differences in the characteristics of antenna modules caused by structural variations in the antenna modules can be reduced.

In addition, in the antenna module of this embodiment, the first impedance converter 181 is connected to the connection part 308 of the divider 140. Furthermore, the second impedance converter 182 is connected to the first output terminal 148 of the divider 140 and the second impedance converter 183 is connected to the second output terminal 149 of the divider 140.

For example, the antenna module 100 is provided with the first impedance converter 181, and consequently, the respective impedances of the line 304, the first impedance converter 181, and the line 141 are 50Ω, 37.3Ω, and 25Ω. Therefore, changes in impedance can be made gentler compared to "an antenna module not equipped with an impedance converter". Therefore, reflection of a signal (for example, reference frequency signal) and so forth can be reduced and signal loss can be reduced compared with "an antenna module not equipped with an impedance converter".

In particular, in this embodiment, the line length of the first impedance converter 181 is λ/4. Thus, the input side impedance of the first impedance converter 181 is 50Ω and the output side impedance of the first impedance converter 181 is 25Ω. Therefore, loss due to signal reflection can be further reduced.

In addition, a configuration in which impedance converters are not connected to all of the input terminal 147, the first output terminal 148, and the second output terminal 149, for example, a configuration in which an impedance converter is connected to the input terminal 147 but an impedance converter is not connected to the first output terminal 148 and the second output terminal 149 is also possible.

However, in the case of this configuration, the impedance on the input side of the divider 140 and the impedance on the output side of the divider 140 will be different from each other. Consequently, there is a risk of an increase in loss due to reflection of a signal input to the divider 140 and so forth and of the communication characteristics being degraded.

Accordingly, in this embodiment, impedance converters are connected to all of the input terminal 147, the first output terminal 148, and the second output terminal 149. Thus, the impedance on the input side of the divider 140 and the impedance on the output side of the divider 140 can be made the same as each other. In this embodiment, the input-side impedance of the divider 140 and the output-side impedance of the divider 140 can both be made 50Ω. Therefore, the occurrence of reflection of a signal input to the divider 140 and so forth can be reduced.

Furthermore, as illustrated in FIG. 5, the antenna module 100 includes the line 304 as a signal line of the first impedance system (for example, an impedance of 50Ω) extending from the input terminal 302 to the divider 140. Furthermore, the antenna module 100 includes the line 141 as a signal line of the second impedance system (for example, an impedance of 25Ω) extending from the input terminal 302 to the divider 140. The line 304 is a line in which radio-frequency signal loss is higher than in the line 141.

Accordingly, in this embodiment, as illustrated in FIG. 5, the length L1 of the line 304, which has higher radio-frequency signal loss, is set to be shorter than the length L2 of the line 141, which has lower radio-frequency signal loss. Therefore, the antenna module 100 of this embodiment is able to reduce loss of a signal (for example, reference frequency signal) compared with "an antenna module in which L1≥L2".

Furthermore, as illustrated in FIG. 1, the plurality of antenna elements 121 of the antenna module 100 of this embodiment are arrayed two dimensionally. Therefore, in the antenna module 100 of this embodiment, the directivity of the antenna array 120 can be adjusted.

Second Embodiment

Figure 6:
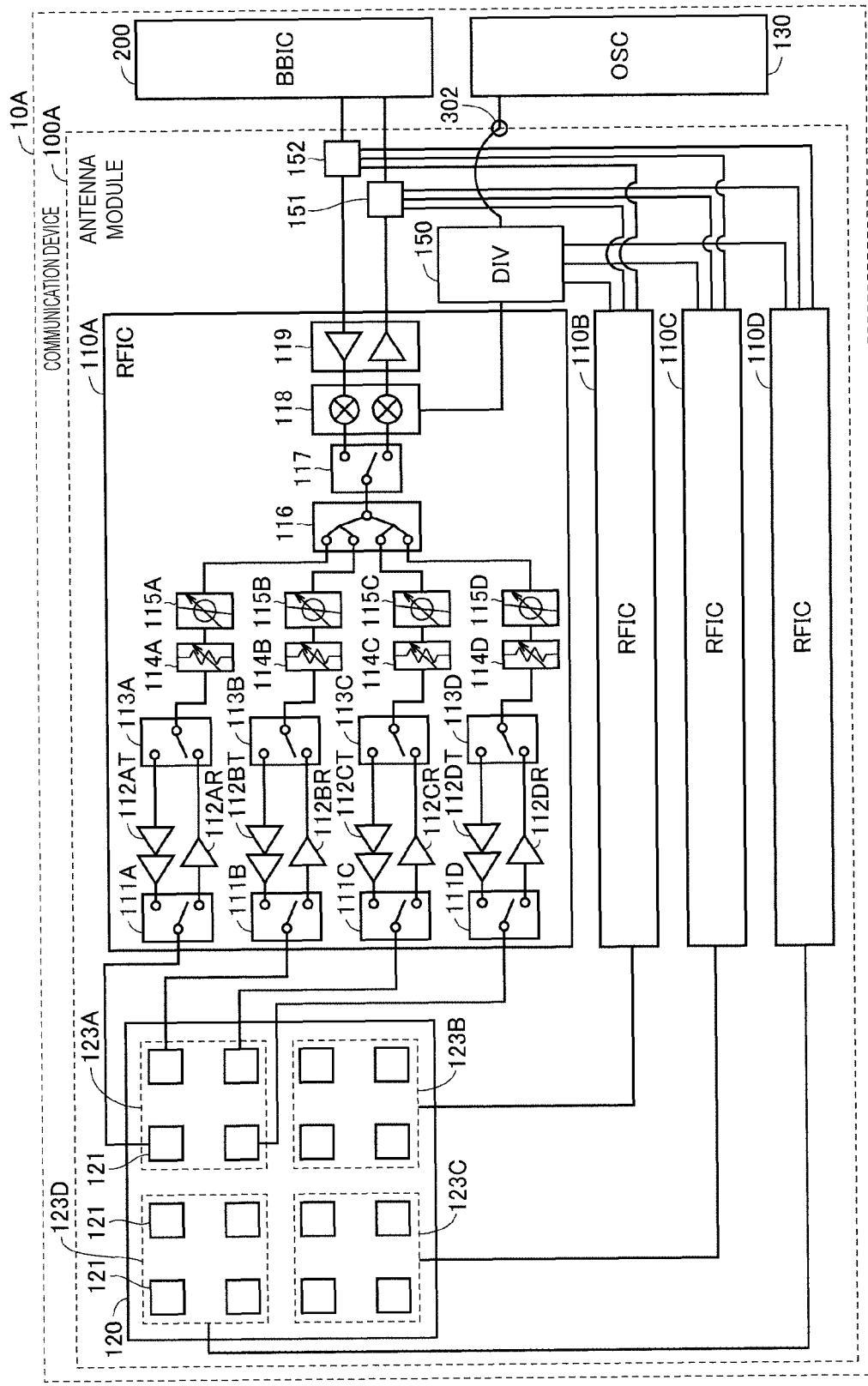
FIG. 6 is a block diagram of a communication device in which an antenna module according to a second embodiment is used.

An antenna module 100A of a second embodiment is an antenna module in which one reference frequency signal is divided and supplied to four RFICs. The antenna module 100A of the second embodiment includes three dividers for dividing and supplying the one reference frequency signal to the four RFICs. FIG. 6 is a block diagram of a communication device 10A in which the antenna module 100A of the second embodiment is used.

Comparing FIGS. 1 and 6, there are two RFICs and two antenna groups in the antenna module 100 in FIG. 1, whereas there are four RFICs and four antenna groups in the antenna module 100A in FIG. 6. The antenna module 100A includes four antenna groups 123A to 123D, which are each formed of four antenna elements 121, and four RFICs 110A to 110D. The four RFICs 110A to 110D output radio-frequency signals to the four antenna groups 123A to 123D. Furthermore, the RFIC 110C corresponds to a "third feeder circuit" and the RFIC 110D corresponds to a "fourth feeder circuit". In addition, the antenna group 123C corresponds to a "third antenna group" and the antenna group 123D corresponds to a "fourth antenna group".

Figure 7:
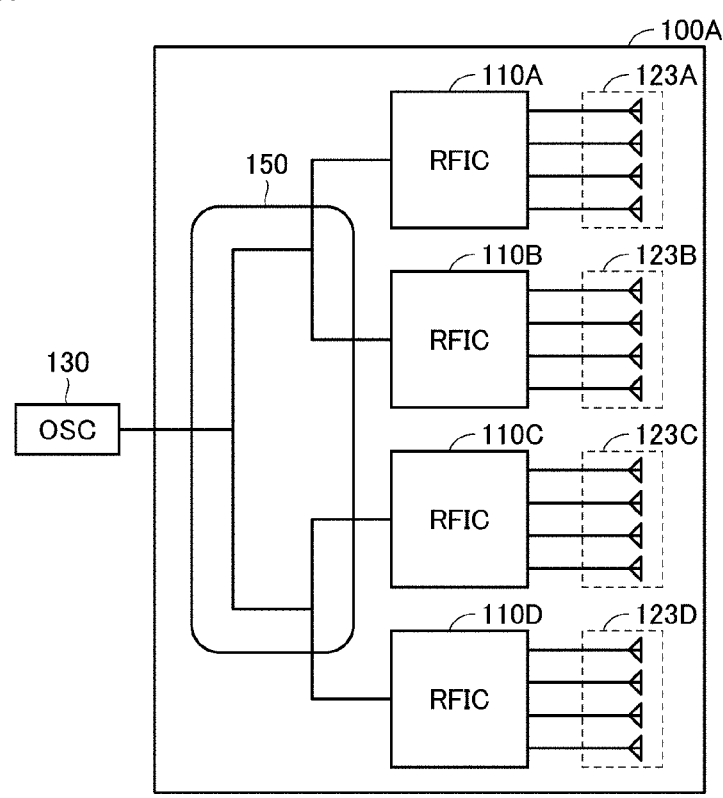
FIG. 7 is a diagram illustrating the main parts of a dividing circuit and so forth.

In addition, the antenna module 100 in FIG. 1 includes the divider 140, whereas the antenna module 100A in FIG. 6 includes a dividing circuit 150 (DIV). FIG. 7 is a diagram illustrating the main parts in FIG. 6. As illustrated in FIG. 7 as well, the reference frequency signal output from the oscillator 130 is divided and supplied to each of the RFICs 110A to 110D by the dividing circuit 150. In addition, the RFICs 110A to 110D respectively supply radio-frequency power to the four antenna groups 123A to 123D.

The dividing circuit 150 includes three dividers as indicated by the three branch points in the dividing circuit 150 in FIG. 7. The reference frequency signal generated by the oscillator 130 is branched into four signals by the dividing circuit 150 and the four signals are output to the mixers 118 of the RFICs 110A to 110D.

A signal output from the BBIC 200 is branched into four signals by the dividing chip 152 and the four signals are output to the amplification circuits 119 of the RFICs 110A to 110D. The combining chip 151 combines signals output from the amplification circuits 119 of the RFICs 110A to 110D and outputs the resulting signal to the BBIC 200.

Figure 8:
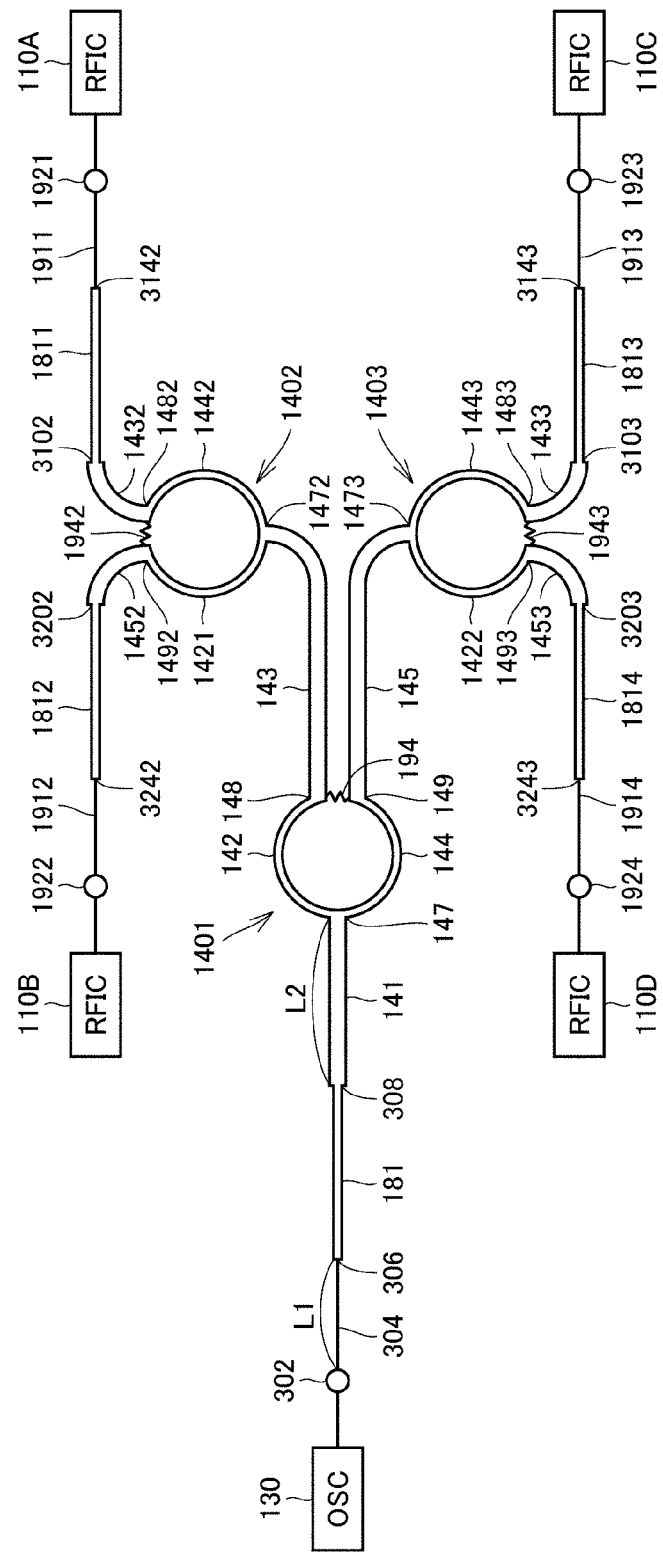
FIG. 8 is a diagram illustrating the configuration of the dividing circuit and so forth in more detail.

FIG. 8 is a diagram illustrating the transmission paths of the first radio-frequency signal transmitted from the oscillator 130 to the RFICs in the second embodiment. FIG. 9 is a plan view of the antenna module 100A in a normal direction, and a first divider 1401, a second divider 1402, a third divider 1403, and so forth are illustrated. In the example in FIGS. 8 and 9, the dividing circuit 150 includes three dividers, namely, the first divider 1401, the second divider 1402, and the third divider 1403. Furthermore, the configurations of the first divider 1401, the second divider 1402, and the third divider 1403 and the impedances of the lines included in the dividers are identical to those of the divider 140 (refer to first embodiment). The first divider 1401, the second divider 1402, and the third divider 1403 are all Wilkinson-type dividers formed of the second impedance system.

The second divider 1402 includes an input terminal 1472, a line 1421, a line 1442, a resistor 1942, a first output terminal 1482, and a second output terminal 1492.

The third divider 1403 includes an input terminal 1473, a line 1422, a line 1443, a resistor 1943, a first output terminal 1483, and a second output terminal 1493.

The first output terminal 148 is connected to one end of the line 143 and the input terminal 1472 of the second divider 1402 is connected to the other end of the line 143. One end of a line 1432 is connected to the first output terminal 1482 of the second divider 1402. One end of a second impedance converter 1811 is connected to the other end of the line 1432 via a connection part 3102. One end of a line 1911 is connected to the other end of the second impedance converter 1811 via a connection part 3142. The other end of the line 1911 is connected to the RFIC 110A via an output terminal 1921.

One end of a line 1452 is connected to the second output terminal 1492 of the second divider 1402. One end of a second impedance converter 1812 is connected to the other end of the line 1452 via a connection part 3202. One end of a line 1912 is connected to the other end of the second impedance converter 1812 via a connection part 3242. The other end of the line 1912 is connected to the RFIC 110B via an output terminal 1922.

The second output terminal 149 is connected to one end of the line 145 and the input terminal 1473 of the third divider 1403 is connected to the other end of the line 145. One end of a line 1433 is connected to the first output terminal 1483 of the third divider 1403. One end of a second impedance converter 1813 is connected to the other end of the line 1433 via a connection part 3103. One end of a line 1913 is connected to the other end of the second impedance converter 1813 via a connection part 3143. The other end of the line 1913 is connected to the RFIC 110C via an output terminal 1923.

In addition, one end of a line 1453 is connected to the second output terminal 1493 of the third divider 1403. One end of the second impedance converter 1814 is connected to the other end of the line 1453 via a connection part 3203. One end of a line 1914 is connected to the other end of the second impedance converter 1814 via a connection part 3243. The other end of the line 1914 is connected to the RFIC 110D via an output terminal 1924.

Next, signal flow will be described. The reference frequency signal output from the oscillator 130 is sequentially transmitted through the input terminal 302, the line 304, the connection part 306, the first impedance converter 181, the connection part 308, the line 141, and the input terminal 147 (branching part). The reference frequency signal input to the input terminal 147 (branching part) is branched into two signals at the input terminal 147 (branching part).

A first signal out of the two signals divided at the input terminal 147 of the first divider 1401 is input to the input terminal 1472 (branching part) of the second divider 1402 via the line 142, the first output terminal 148, and the line 143.

One first signal out of two first signals divided at the input terminal 1472 (branching part) of the second divider 1402 is sequentially transmitted through the line 1442, the first output terminal 1482, the line 1432, the connection part 3102, the second impedance converter 1811, the connection part 3142, the line 1911, and the output terminal 1921 and is input to the RFIC 110A.

The other first signal out of the two first signals divided at the input terminal 1472 (branching part) is sequentially transmitted through the line 1421, the second output terminal 1492, the line 1452, the connection part 3202, the second impedance converter 1812, the connection part 3242, the line 1912, and the output terminal 1922 and is input to the RFIC 110B.

A second signal out of the two signals divided at the input terminal 147 of the first divider 1401 is input to the input terminal 1473 (branching part) of the third divider 1403 via the line 144, the second output terminal 149, and the line 145.

One second signal out of two second signals divided at the input terminal 1473 (branching part) is sequentially transmitted through the line 1443, the first output terminal 1483, the line 1433, the connection part 3103, the second impedance converter 1813, the connection part 3143, the line 1913, and the output terminal 1923 and is input to the RFIC 110C.

The other second signal out of the two second signals divided at the input terminal 1473 (branching part) of the third divider 1403 is sequentially transmitted through the line 1422, the second output terminal 1493, the line 1453, the connection part 3203, the second impedance converter 1814, the connection part 3243, the line 1914, and the output terminal 1924 and is input to the RFIC 110D.

Next, the impedances will be described. The impedances of the line 304, the line 1911, the line 1912, the line 1913, and the line 1914 are Z0 (first impedance, for example, 50Ω).

The impedances of the line 141, the line 143, the line 145, the line 1432, the line 1452, the line 1433, and the line 1453 are Z1 (second impedance, for example, 25Ω).

The impedances of the first impedance converter 181, the second impedance converter 1811, the second impedance converter 1812, the second impedance converter 1813, and the second impedance converter 1814 are around 35.3Ω (refer to Formula (1)).

The impedances of the line 142, the line 144, the line 1421, the line 1442, the line 1422, and the line 1443 are $\sqrt{2} \times Z1$ (for example, around 35.3Ω).

The impedances of the resistor 194, the resistor 1942, and the resistor 1943 are 2×Z1 (for example, around 35.3Ω).

In addition, no lines of the first impedance system are provided between the one first output terminal 148 of the first divider 1401 and the input terminal 1472 of the second divider 1402, and these terminals are connected to each other only by the line 143 of the second impedance system. In addition, no lines of the first impedance system are provided between the other second output terminal 149 of the first divider 1401 and the input terminal 1473 of the third divider 1403, and these terminals are connected to each other only by the line 145 of the second impedance system.

As a modification, either the first output terminal 148 and the input terminal 1472 of the second divider 1402 or the second output terminal 149 and the input terminal 1473 of the third divider 1403 may be connected to each other by only the line 143 of the second impedance system. In addition, the other pair of terminals may be connected to each other using a line of another impedance system (for example, line of first impedance system). In other words, at least either the first output terminal 148 and the input terminal 1472 of the second divider 1402 or the second output terminal 149 and the input terminal 1473 of the third divider 1403 may be connected to each other by only the line 143 of the second impedance system.

In this embodiment, as illustrated in FIG. 8, the second divider 1402 is connected to one first output terminal 148 out of the two output terminals of the first divider 1401. The second divider 1402 further divides the first radio-frequency signal (above-mentioned first signal) divided by the first divider 1401 and outputs the resulting first radio-frequency signals to the first feeder circuit (RFIC 110A) and the second feeder circuit (RFIC 110B).

Furthermore, the third divider 1403 is connected to the other second output terminal 149 out of the two output terminals of the first divider. The third divider 1403 further divides the first radio-frequency signal (above-mentioned second signal) divided by the first divider 1401 and outputs the resulting first radio-frequency signals to the third feeder circuit (RFIC 110C) and the fourth feeder circuit (RFIC 110D). Therefore, the signal from the oscillator 130 can be divided and supplied to the four RFICs 110A to 110D.

In addition, in the antenna module 100A of this embodiment, the impedance on the input side of the dividing circuit 150 and the impedance on the output side of the dividing circuit 150 can be made the same as each other. In this embodiment, the input-side impedance of the dividing circuit 150 and the output-side impedance of the dividing circuit 150 can both be made 50Ω. Therefore, in the antenna module 100, reflection of a signal and so forth can be reduced and signal loss can be reduced.

In addition, no lines of the first impedance system are provided between the one first output terminal 148 of the first divider 1401 and the input terminal 1472 of the second divider 1402, and these terminals are connected to each other only by the line 143 of the second impedance system. Furthermore, no lines of the first impedance system (lines of a high impedance system) etc. are arranged between the other second output terminal 149 of the first divider 1401 and the input terminal 1473 of the third divider 1403 and these terminals are connected to each other only by the line 145 of the second impedance system (line of low impedance system). Therefore, signal loss between the first divider 1401 and the second divider 1402 and signal loss between the first divider 1401 and the third divider 1403 can be reduced compared with "an antenna module in which a line of the first impedance system is included between the first output terminal 148 and the input terminal 1472 of the second divider 1402 and a line of the first impedance system is included between the second output terminal 149 and the input terminal 1473 of the third divider 1403.

Furthermore, in the example in FIG. 9, there are four sets each consisting of four passive elements 122 and an RFIC. In the example in FIG. 9, the shape of the antenna module 100A in a plan view in the normal direction is a rectangular shape. The four sets are arranged at the four corners of the rectangular shape. Furthermore, the first divider 1401, the second divider 1402, and the third divider 1403 are arranged in the middle between the four sets. With this configuration, the antenna module 100A can be reduced in size.

Third Embodiment

In a third embodiment, lines connecting the combining chip 151 and the RFICs 110A to 110D to each other and lines connecting the dividing chip 152 and the RFICs 110A to 110D to each other are collectively referred to as a "line group". A line group transmits the second radio-frequency signal from the BBIC 200 (second output circuit) to the RFICs 110A to 110D. In the antenna module of the third embodiment, a layer in which the line group is arranged and a layer in which the dividing circuit 150 is arranged are provided so as to be separate from each other.

Figure 10:
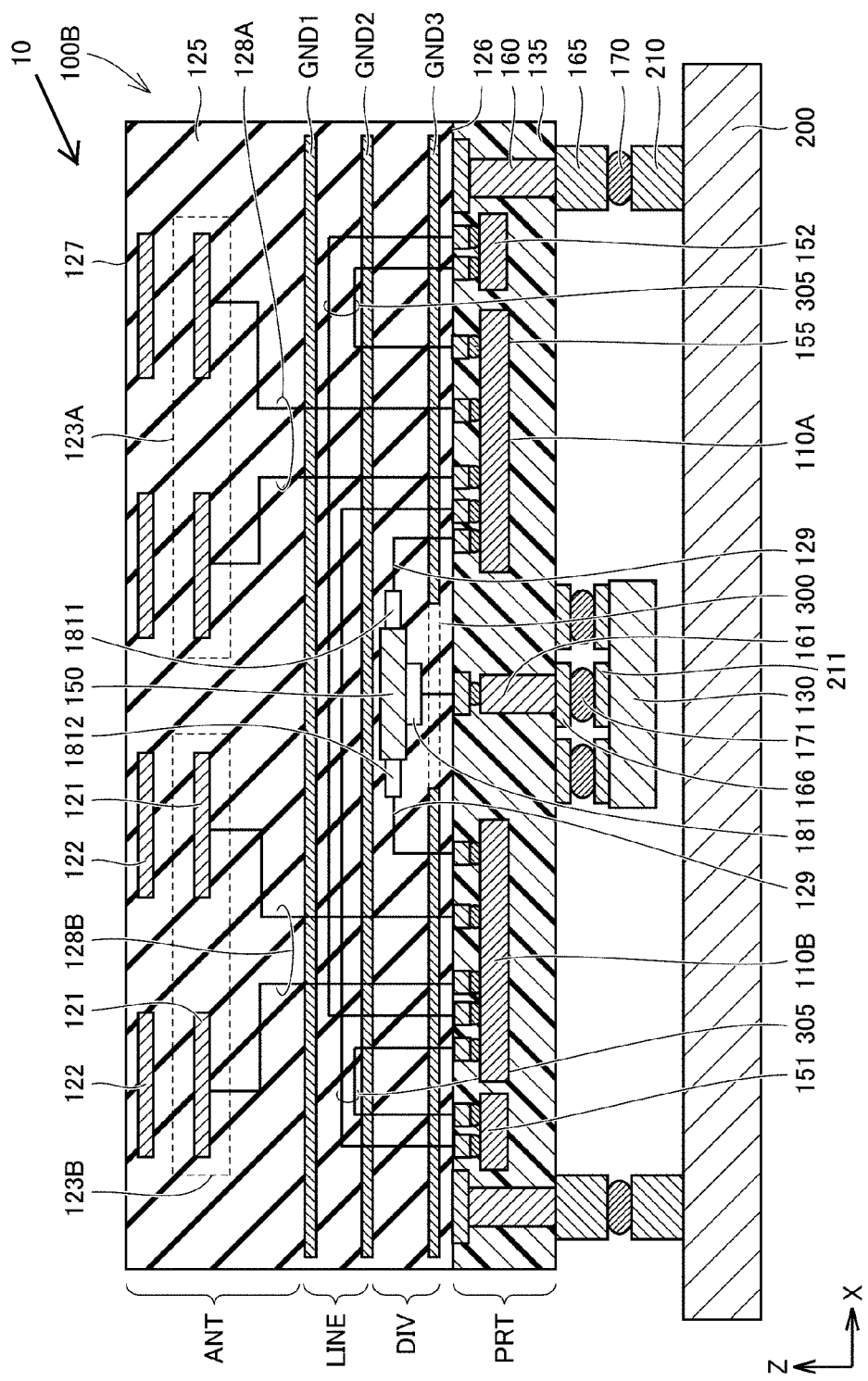
FIG. 10 is a sectional view of an antenna module of a third embodiment.

FIG. 10 is a sectional view of an antenna module 100B of a third embodiment. The antenna module 100B includes the ground electrode GND1, the ground electrode GND2, and a ground electrode GND3. In the example in FIG. 10, the ground electrode GND1, the ground electrode GND2, and the ground electrode GND3 are provided in the order of the ground electrode GND1, the ground electrode GND2, and the ground electrode GND3 in a direction from the layer in which the antenna elements 121 are arranged toward the mounting surface 126 in the thickness direction of the dielectric substrate 125. The ground electrode GND1, the ground electrode GND2, and the ground electrode GND3 respectively correspond to a "first ground electrode", a "second ground electrode", and a "third ground electrode".

In the example in FIG. 10, a line group 305 (lines that connect the combining chip 151 and the RFICs 110A to 110D to each other and lines that connect the dividing chip 152 and the RFICs 110A to 110D to each other) is arranged in a layer between the ground electrode GND1 and the ground electrode GND2. In addition, the dividing circuit 150 is arranged in a layer between the ground electrode GND2 and the ground electrode GND3.

Furthermore, the layer in which the dividing circuit 150 (first divider 1401, second divider 1402, and third divider 1403) is arranged is referred to as a "divider layer DIV". The layer in which the line group 305 is arranged is referred to as the "wiring layer LINE". The line group 305 corresponds to a "signal line".

Figure 11A:
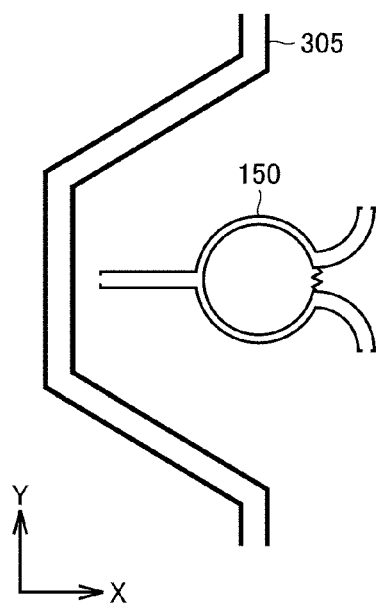
FIGS. 11A and 11B are diagrams illustrating a divider and so forth of the third embodiment.
Figure 11B:
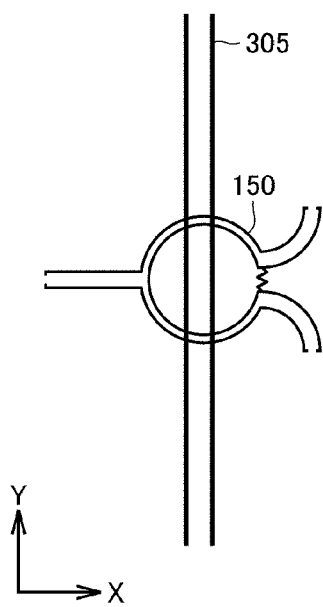

FIGS. 11A and 11B are diagrams illustrating the line group 305 and the dividing circuit 150 in a plan view in a thickness direction of the dielectric substrate 125 from the side where the antenna elements 121 and the passive elements 122 are formed. In the example in FIGS. 11A and 11B, the dividing circuit 150 is illustrated as one divider.

FIG. 11A illustrates a comparative example and FIG. 11B illustrates this embodiment. In the comparative example in FIG. 11A, the line group and the dividing circuit 150 are arranged between the same GNDs. If the line group 305 and the dividing circuit 150 are arranged so that the line group 305 and the dividing circuit 150 overlap in a plan view in the thickness direction of the dielectric substrate 125, there is a risk of the line group 305 and the dividing circuit 150 electromagnetically coupling with each other. Accordingly, as illustrated in FIG. 11A, in the comparative example, it is suitable to arrange the line group 305 and the dividing circuit 150 so that the line group 305 and the dividing circuit 150 do not overlap (the line group 305 is rerouted) in a plan view in the thickness direction of the dielectric substrate 125.

When the configuration in FIG. 11A is adopted, the region in which the line group 305 is arranged in a plane perpendicular to the thickness direction of the dielectric substrate 125 (i.e., the XY plane in FIGS. 11A and 11B) increases in size. In addition, since it is suitable to arrange the line group 305 and the dividing circuit 150 so as to not overlap in a plan view in the thickness direction of the dielectric substrate 125, this results in a reduction in the degree of freedom with which the line group 305 can be arranged.

Accordingly, in this embodiment, as illustrated in FIG. 10, the line group 305 is arranged in a layer between the ground electrode GND1 and the ground electrode GND2. In addition, the dividing circuit 150 is arranged in a layer between the ground electrode GND2 and the ground electrode GND3.

As also described in the second embodiment, the first divider 1401, the second divider 1402, and the third divider 1403 are formed of the second impedance system, and therefore the dielectric layer in which the first divider 1401, the second divider 1402, and the third divider 1403 are arranged (DIV layer in which the dividing circuit 150 is arranged) can be reduced in thickness.

Therefore, with the addition of the ground electrode GND3, it is possible to arrange the line group 305 in a layer between the ground electrode GND1 and the ground electrode GND2 and to arrange the dividing circuit 150 in a layer between the ground electrode GND2 and the ground electrode GND3.

With this configuration, a shield layer (ground electrode GND2 in example in FIG. 10) can be provided between the line group 305 and the dividing circuit 150. Therefore, as illustrated in FIG. 11B, the line group 305 can be arranged so as to overlap the dividing circuit 150 in a plan view of the antenna module 100 in the thickness direction of the dielectric substrate 125 from the side where antenna elements 121 and the passive elements 122 are formed. Therefore, according to the antenna module 100B of the third embodiment, the region in which line group 305 is arranged in a plane perpendicular to the thickness direction of the dielectric substrate 125 (i.e., the XY plane in FIGS. 11A and 11B) can be reduced in size compared with the comparative example. In addition, according to the antenna module 100B of the third embodiment, since there is no need to reroute the line group 305 like in the comparative example in FIG. 11A, the degree of freedom for arranging the line group 305 can be improved compared with the comparative example.

Furthermore, even when the line group 305 and the dividing circuit 150 are arranged so that the line group 305 and the dividing circuit 150 overlap, electromagnetic coupling between the line group 305 and the dividing circuit 150 can be reduced by the ground electrode GND2. Therefore, degradation of the characteristics of the antenna module can be suppressed. Furthermore, in this embodiment, the line group 305 and the dividing circuit 150 may be arranged so that the line group 305 and the dividing circuit 150 do not overlap depending on the design of the antenna module.

Modifications

The present disclosure is not limited to the embodiments described above. The present disclosure is not limited to the above-described embodiments and various modifications and applications are possible.

(1) In the above embodiments, a configuration in which impedance converters are provided has been described. However, a configuration in which an impedance converter is not provided may be adopted. With this configuration, the cost associated with such impedance converters can be saved compared with an antenna module that is equipped with impedance converters.

(2) In FIG. 4 and so on, a configuration is illustrated in which impedance converters are connected to a divider via lines. For example, in the example in FIG. 4, a configuration is illustrated in which the first impedance converter 181 is connected to the divider 140 via the line 141. However, an impedance converter may instead be directly connected to a divider without necessarily a line interposed therebetween. With this configuration, the cost associated with the line can be saved compared with an antenna module equipped with a line.

(3) In FIG. 5, an example is illustrated in which the impedance changes in three stages, namely, 50Ω, around 35.3Ω, and 25Ω in the line 304, the first impedance converter 181, and the line 141. However, the number of stages may be four or more.

(4) The length of a signal line of the first impedance system from an output terminal to a divider may be shorter than the length of a signal line of the second impedance system from the output terminal to the divider. For example, in FIG. 5, a length L3 of the line 316 of the first impedance system from the output terminal 318 in FIG. 5 to the divider 140 may be shorter than a length L4 of the line 143 of the second impedance system from the output terminal 318 to the divider 140. According to this configuration, loss of a radio-frequency signal can be reduced compared with "an antenna module in which L3≥L4".

(5) The first divider 1401, the second divider 1402, and the third divider 1403 in the above-described embodiment are described as not being equipped with an input-terminal-side second impedance signal line and an output-terminal-side second impedance signal line. For example, in FIG. 5, the first divider 1401 is described as not including "the input-terminal-side signal line 141, the output-terminal-side signal line 143, and the output-terminal-side signal line 145" as second impedance signal lines. However, at least one out of the first divider 1401, the second divider 1402, and the third divider 1403 may be configured to include at least one out of an input-terminal-side second impedance signal line and an output-terminal-side second impedance signal line. For example, the first divider 1401, the second divider 1402, and the third divider 1403 may be configured to include both an input-terminal-side second impedance signal line and an output-terminal-side second impedance signal line.

Figure 13:
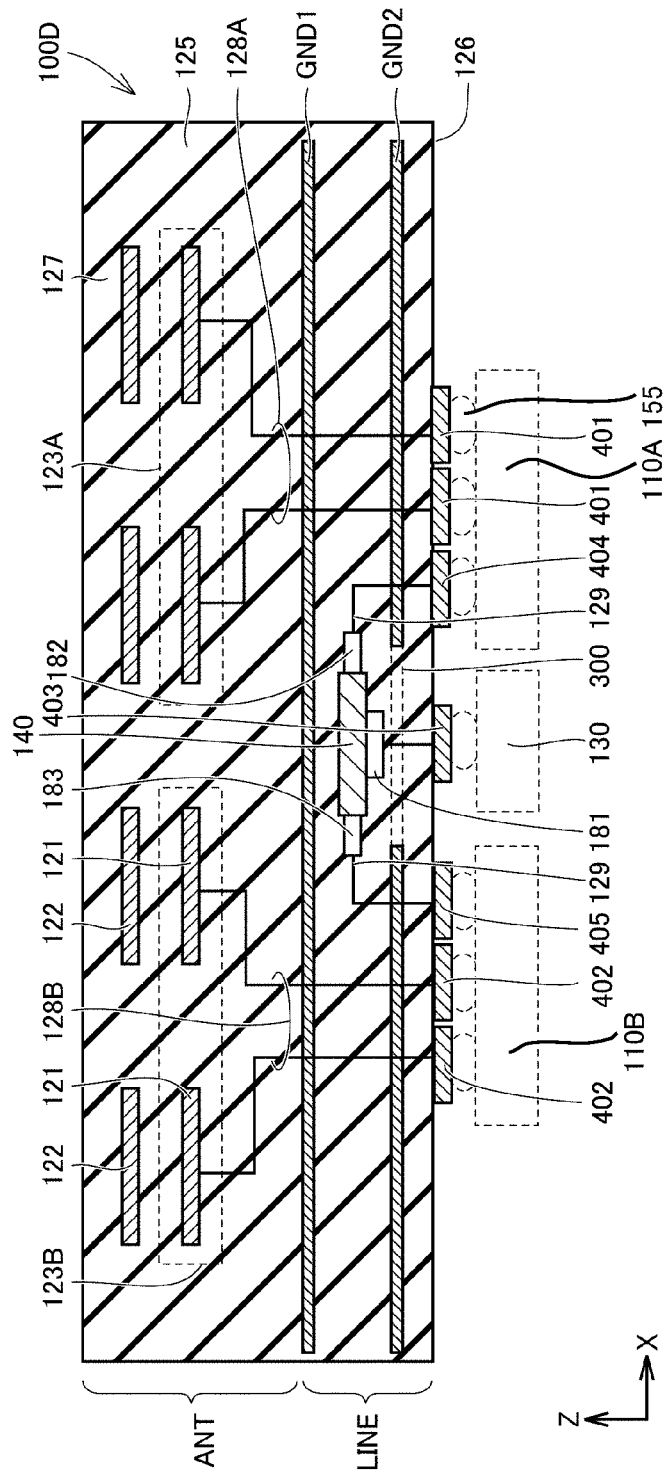
FIG. 13 is a sectional view of an antenna module according to a modification.

(6) FIG. 13 is a sectional view of an antenna module 100D of a modification. In the example in FIG. 2, it is described that the first terminal electrodes 401, the second terminal electrodes 402, the third terminal electrode 403, the fourth terminal electrode 404, the fifth terminal electrode 405, the RFICs 110A and 110B, and the solder bumps 155 are sealed by the resin 135. However, as illustrated in FIG. 13, the first terminal electrodes 401, the second terminal electrodes 402, the third terminal electrode 403, the fourth terminal electrode 404, the fifth terminal electrode 405, the RFICs 110A and 110B, and the solder bumps 155 do not have to be sealed. In the example in FIG. 13, the RFICs 110A and 110B are externally attached to the antenna module 100D. The RFICs 110A and 110B are connected to the antenna module 100D via solder bumps 155. The antenna module 100D of the example in FIG. 13 does not include the RFICs 110A and 110B but does include the dielectric substrate 125, the antenna groups 123A and 123B, the first terminal electrodes 401, the second terminal electrodes 402, the third terminal electrode 403, the fourth terminal electrode 404, the fifth terminal electrode 405, and the divider 140. In the example in FIG. 13, the RFICs 110A and 110B and the solder bumps 155 not included in the antenna module 100D are illustrated using broken lines.

(7) In the above embodiments, a configuration is described in which the RFIC 110A corresponds to a "first feeder circuit" and the RFIC 110B corresponds to a "second feeder circuit". However, at least either one of the first feeder circuit and the second feeder circuit may be part of a circuit having a function of supplying radio-frequency power.

Figure 12:
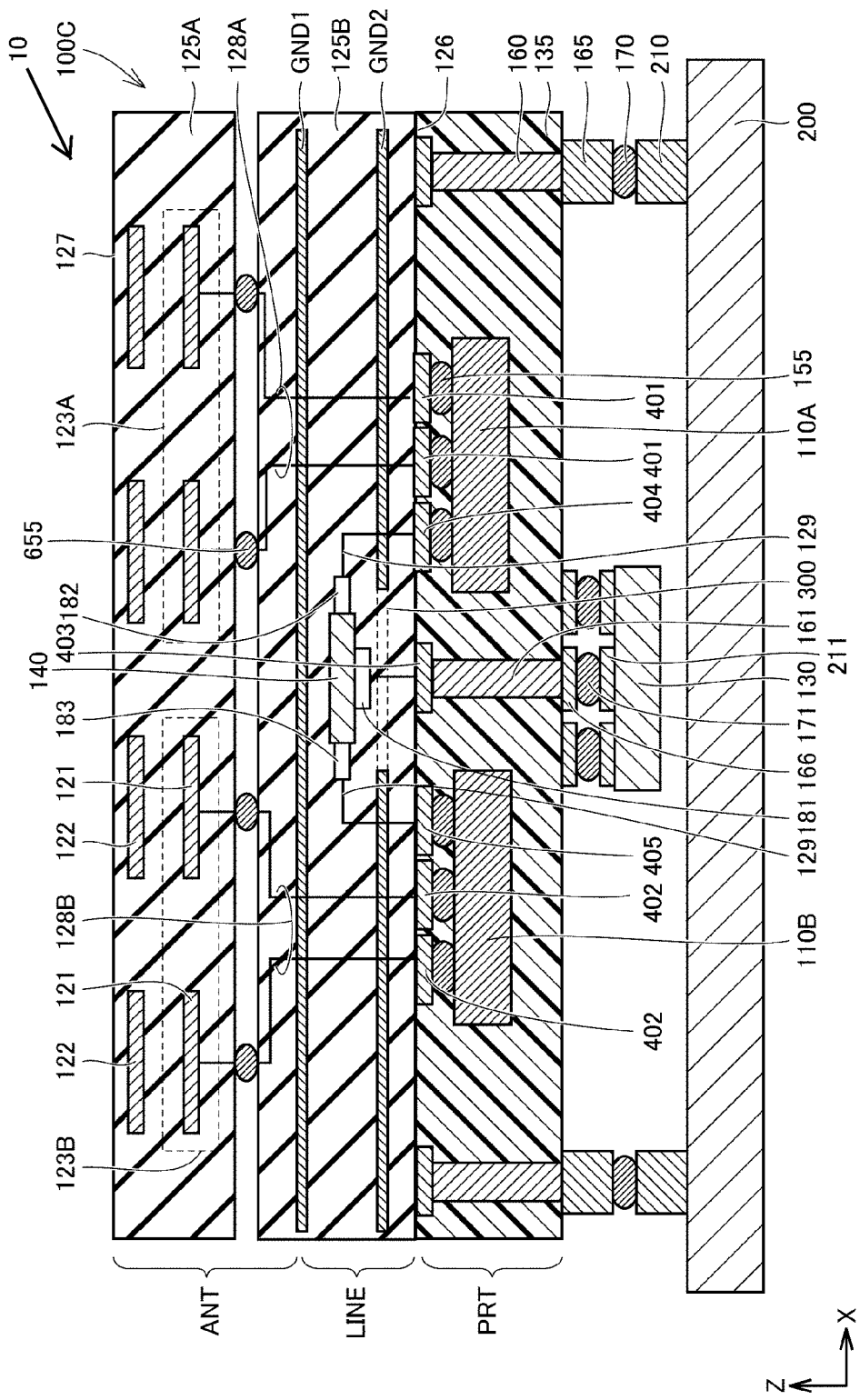
FIG. 12 is a sectional view of an antenna module according to a modification.

(8) In the antenna module 100 in FIG. 2, it is described that a dielectric substrate in which the antenna elements 121 and the passive elements 122 are arranged and a dielectric substrate in which the divider 140 is arranged are the same dielectric substrate. FIG. 12 is a sectional view of a state in which an antenna module 100C of a modification is mounted on the BBIC 200. As illustrated in FIG. 12, in the antenna module 100C, a dielectric substrate in which the antenna elements 121 and the passive elements 122 are arranged and a dielectric substrate in which the divider 140 is arranged are different dielectric substrates. In the example in FIG. 12, the antenna elements 121 and the passive elements 122 are arranged in a dielectric substrate 125A and the divider 140 is arranged in a dielectric substrate 125B. The dielectric substrate 125A and the dielectric substrate 125B are integrated with each other via solder bumps 655. In addition, the dielectric substrate 125A and the dielectric substrate 125B may be connected to each other via wiring lines. In this case, the dielectric substrate 125A and the dielectric substrate 125B are for example integrated with each other using an adhesive or the like.

The presently disclosed embodiments are illustrative in all points and should not be considered as limiting. The scope of the above embodiments is not defined by the above description of the embodiments but rather by the scope of the claims and it is intended that equivalents to the scope of the claims and all modifications within the scope of the claims be included within the scope of the embodiments.

REFERENCE SIGNS LIST 10 communication device, 100 antenna module, 111A to 111D, 113A to 113D, 117 switch, 112AR to 112DR low-noise amplifier, 112AT to 112DT power amplifier, 114A to 114D attenuator, 115A to 115D phase shifter, 116 signal multiplexer/demultiplexer, 118 mixer, 119 amplification circuit, 120 antenna array, 121 antenna element, 122 passive element, 125 dielectric substrate, 126 mounting surface, 127 surface, 128A, 128B feeder line, 129 wiring pattern, 130 oscillator, 135 resin, 140 divider, 150 dividing circuit, 155, 170, 171 bump, 160, 161, 211 through electrode, 165, 166 electrode pattern, 181 first impedance converter, 182, 183, 1811, 1812, 1813, 1814 second impedance converter, 1401 first divider, 1402 second divider, 1403 third divider.

The invention claimed is:

1. An antenna module comprising:
a dielectric substrate having a multilayer structure;
a first antenna group and a second antenna group in the dielectric substrate, each of the first antenna group and the second antenna group including a plurality of antenna elements;
a first feeder circuit and a second feeder circuit that are configured to respectively supply radio-frequency power to the first antenna group and to the second antenna group; and
a dividing circuit configured to divide a first radio-frequency signal input to the dividing circuit from a third terminal electrode, and to output first divided radio-frequency signals to the first feeder circuit and to the second feeder circuit, wherein:

the first feeder circuit and the second feeder circuit are mounted on a mounting surface of the dielectric substrate, and
the dividing circuit: is in a layer of the dielectric substrate that is closer to the mounting surface than a layer of the dielectric substrate in which the first antenna group and the second antenna group are located, and
comprises a Wilkinson-type first divider that comprises a circuit having a second impedance that is less than a first impedance of a signal transmission system in which the dividing circuit is located.

2. The antenna module according to claim 1, further comprising:
a first impedance converter that is connected to an input terminal of the dividing circuit and that is configured to convert the first impedance into the second impedance; and
a second impedance converter that is connected to an output terminal of the dividing circuit and that is configured to convert the second impedance into the first impedance.

3. The antenna module according to claim 1, further comprising:
a third antenna group and a fourth antenna group that are in the dielectric substrate, each of the third antenna group and the fourth antenna group including a plurality of antenna elements; and
a third feeder circuit and a fourth feeder circuit that are configured to respectively supply radio-frequency power to the third antenna group and to the fourth antenna group,
wherein the dividing circuit further comprises:
a second divider that is connected to a first output terminal of the first divider and that is configured to further divide one of the first divided radio-frequency signals divided by the first divider and to output second divided radio-frequency signals to the first feeder circuit and to the second feeder circuit, and
a third divider that is connected to a second output terminal of the first divider and that is configured to further divide another of the first divided radio-frequency signals divided by the first divider and to output third divided radio-frequency signals to the third feeder circuit and to the fourth feeder circuit.

4. The antenna module according to claim 3, wherein the first output terminal of the first divider and an input terminal of the second divider, or the second output terminal of the first divider and an input terminal of the third divider, are connected to each other by only a signal line of the second impedance system.

5. The antenna module according to claim 1, wherein:
the first radio-frequency signal is a reference frequency signal used by the first feeder circuit and the second feeder circuit,
the antenna module further comprises a terminal to which the first radio-frequency signal is input, and
a length of a signal line of the first impedance from the terminal to the dividing circuit is less than a length of a signal line of the second impedance from the terminal to the dividing circuit.

6. The antenna module according to claim 1, wherein:
the first feeder circuit and the second feeder circuit are configured to generate radio-frequency power by mixing the first radio-frequency signal and a second radio-frequency signal, the first radio-frequency signal being a reference frequency signal, the antenna module further comprises a first ground electrode, a second ground electrode, and a third ground electrode that are each in different layers of the dielectric substrate, a signal line along which the second radio-frequency signal is transmitted is in a layer that is between the first ground electrode and the second ground electrode, and the dividing circuit is in a layer that is between the second ground electrode and the third ground electrode.

7. The antenna module according to claim 6, wherein, as seen in a plan view of the antenna module, the signal line overlaps the dividing circuit.

8. The antenna module according to claim 1, wherein the plurality of antenna elements is arrayed in a two dimensional manner.

9. A communication device comprising:
the antenna module according to claim 1.

10. An antenna module comprising:
a dielectric substrate having a multilayer structure;
a first antenna group and a second antenna group in the dielectric substrate, each of the first antenna group and the second antenna group including a plurality of antenna elements;
a first terminal electrode and a second terminal electrode configured to supply radio-frequency power to the first antenna group and to the second antenna group, respectively;
a third terminal electrode to which a first radio-frequency signal is input;
a fourth terminal electrode and a fifth terminal electrode configured to output the first radio-frequency signal; and
a dividing circuit configured to divide the first radio-frequency signal and to output first divided radio-frequency signals to the fourth terminal electrode and to the fifth terminal electrode, wherein:

the first terminal electrode, the second terminal electrode, the third terminal electrode, the fourth terminal electrode, and the fifth terminal electrode are on a mounting surface of the dielectric substrate, and the dividing circuit:
is in a layer of the dielectric substrate that is closer to the mounting surface than a layer of the dielectric substrate in which the first antenna group and the second antenna group are located, and
comprises a Wilkinson-type first divider that comprises a circuit having a second impedance that is less than a first impedance of a signal transmission system in which the dividing circuit is located.

11. A communication device comprising:
The antenna module according to claim 10.

* * * * *